_United States Patent Office_

3,440,059
Patented Apr. 22, 1969

3,440,059
ACTIVE DRY YEAST
Seymour Pomper, Stamford, Conn., and Emanuel Akerman, Bronx, N.Y., assignors to Standard Brands Incorporated, New York, N.Y., a corporation of Delaware
No Drawing. Filed May 31, 1966, Ser. No. 553,659
Int. Cl. C12c *11/02;* A23j *1/18;* A23l *1/28*
U.S. Cl. 99—96                                     11 Claims

ABSTRACT OF THE DISCLOSURE

An active dry yeast product comprising yeast having a low moisture level and a small but effective amount of an antioxidant selected from the group consisting of 4-hydroxymethyl-2,6-di-tert-butylphenol; 4,4-methylenebis(2,6-di-tert-butylphenol); 3,4-methylenedioxyphenol; 2,5-dihydroxybenzoic acid and 1,2-dihydroethoxy-2,2,4-trimethyl quinoline. The small amount of the antioxidant present imparts superior air storage stability to the yeast product.

---

This invention relates to an active dry yeast product with a high degree of storage stability and a method of preparing the same.

Commercial active dry yeast as sold today is a yeast product which has been dehydrated under controlled conditions to a moisture level of about 8 percent by weight. The keeping qualities, cool water tolerance and the initial or fresh activity of active dry yeast are dependent upon its moisture level. For example, as yeast is dried more and more of its fresh activity is destroyed. However, at high moisture levels the rate of loss of activity of the yeast during storage, especially in air, will be greater than at low moisture levels. Accordingly, when active dry yeasts are stored for relatively long periods of time, the activity of the yeast having a low moisture level will eventually be greater than the activity of the yeast having a high moisture level. The cool water tolerance of yeast also is detrimentally affected when it is dried to low moisture levels. Cool water tolerance is a measure of a yeast's leavening activity after it has been rehydrated in cool water; for instance, in water at 70° F. Thus the level of 8 percent moisture has been selected so that the yeast has relatively good keeping qualities, its initial or fresh activity has not been reduced too much and it has fair cool water tolerance.

One method which has been used to partially overcome the storage problem is to package the yeast in containers from which air has been evacuated or replaced by nitrogen or another inert gas. Such packaging has obvious disadavntages and moreover even when packaged in this manner active dry yeast still loses a significant amount of its activity.

It is the principal object of the present invention to provide an active dry yeast product with superior storage stability. It is a further object of the present invention to provide an active dry yeast product with improved initial or fresh leavening activity. A still further object of the present invention is to provide an active dry yeast which may be rehydrated in cool water without substantially reducing its initial leavening activity.

We have found that the principal object may be accomplished by incorporating into yeast, prior to drying the yeast, a small amount of an antioxidant selected from the group consisting of 4-hydroxymethyl-2,6-di-tert-butylphenol; 4,4-methylenebis(2,6 - di-tert-butylphenol); 3,4-methylene dioxyphenol; 2,5-dihydroxybenzoic acid; 1,2-dihydro-6-ethoxy-2,2,4-trimethyl quinoline and mixtures of any two or more of these compounds.

The majority of these antioxidants are usually referred to and purchased by trade names, for example 4-hydroxymethyl-2,6-di-tert-butylphenol is "Ionox 100" and is manufactured by Shell Chemical Company; 1,2-dihydro-6-ethoxy-2,2,4-trimethyl quinoline is "Santoquin" and is manufactured by Monsanto Chemical Company; and 4,4-methylenebis(2,6-di-tert-butylphenol) is "Ethyl 702" and is manufactured by Ethyl Corp. 3,4-methylene dioxyphenol is commonly referred to as sesamol.

These antioxidants are thoroughly dispersed in the yeast in any convenient way before drying. For example, they may be dissolved in a suitable edible solvent and the solution added to an aqueous suspension of yeast cells (cream yeast) or to a wet yeast cake filtered therefrom. The antioxidants may also be emulsified and then incorporated in the cream yeast or the wet yeast cake.

Suitable edible solvents are, for example, glyceridic fats and oils such as peanut oil, soybean oil, corn oil and hydrogenated oils or other nontoxic solvents, for instance propylene glycol.

Very small amounts of the antioxidant are sufficient, for instance, about 0.025 to about 0.5 percent by weight based on the weight of the yeast solids. Larger amounts may be used but they do not appear to confer any additional benefit. The greatest benefit seems to be obtained with amounts between about 0.1 and about 0.2 percent.

The amount of edible solvent employed may vary over a wide range, the only requirement being that the amount be sufficient to substantially dissolve or emulsify the antioxidant and not so large as to affect the yeast detrimentally. Satisfactory active dry yeast products have been obtained, for example with amounts of edible solvents up to about 3 percent by weight.

It is a further embodiment of the present invention to provide various surfactants or emulsifiers in addition to the antioxidant in active dry yeast. The surfactants or emulsifiers are selected for their ability to impart cool water tolerance to the active dry yeast products of the present invention and/or to permit the yeast to be dried to low moisture levels without substantially reducing its leavening activity. Such surfactants or emulsifiers are, for instance, sorbitan monostearate, sorbitan monapalmitate, sorbitan tristearate and glyceryl diesters such as sodium phosphated glyceryl monostearate, stearyl monoglyceride citrate, a mixture of sodium sulfoacetated monoglyceride of stearic acid and sodium sulfoacetated monoglyceride of palmitic acid, succinylated monoglycerides of saturated fatty acids having carbon chain lengths in the range of 13 to 21 and diacetyl tartaric acid ester of fully hydrogenated vegetable oil monoglyceride, and sucrose diesters such as sucrose distearate and sucrose dipalmitate While as little as 0.25 percent of these compounds based on the weight of the yeast solids imparts beneficial effects to active dry yeast, the greatest benefits are obtained at a level between about 1 and about 2 percent. Greater amounts may safely be added but amounts above 5 percent are not recommended since no additional benefit is obtained. These surfactants or emulsifiers can be incorporated in a wet yeast cake or in cream yeast either separately or along with the antioxidant.

It is preferred that the surfactant or emulsifier and the antioxidant be first mixed together in an edible solvent and this mixture or solution added to the yeast. In this manner of incorporation, smaller amounts of an edible solvent will suffice since the surfactant or emulsifier will help effect dissolution of the antioxidant. This method of incorporation is particularly advantageous when 4-hydroxymethyl-2,6-di-tert-butylphenol is used since it has a relatively low solubility in the commonly used solvents.

When the yeast contains both the surfactant or emulsifier and the antioxidant, good storage stability is obtained when the yeast is dried to a moisture content in the range up to about 7.5%. The preferred moisture range is between about 4 and about 7 percent by weight. When the antioxidant is incorporated in the yeast without the surfactant or emulsifier it is desirable to reduce the moisture content of the yeast to about 6% or less to obtain the desired storage stability.

In order to more clearly describe the nature of the present invention, specific examples will hereinafter be described. It should be understood, however, that this is done solely by way of example and is intended neither to delineate the scope of the invention or limit the ambit of the appended claims. In the example and throughout the specification, percentages are intended to refer to percent by weight unless otherwise specified.

EXAMPLE 1

This example illustrates the preparation of active dry yeast products of the present invention and compares the storage stability, the cool water tolerance and the fresh or initial leavening activity of these products and of control samples.

Products of the present invention

One part of TEM-4H (a diacetyl tartaric acid ester of fully hydrogenated soybean oil monoglyceride manufactured by Hachmeister Incorporated) was added to 9 parts of water, heated to 190° F. and to this was added to hot suspension, at about 190° F., containing 0.21 gm. of "Ionox 100" and 1.47 gm. of peanut oil. This mixture was homogenized and 23.0 gm. of it mixed for 10 minutes with 600 gm. of pressed yeast cake containing about 35% yeast solids.

A TEM-4H suspension was prepared as above and incorporated into 600 gm. of pressed yeast cake containing 35 percent yeast solids with thorough mixing. 1.85 gm. of a warm (120° F.) peanut oil-"Santoquin" solution, containing 1.3 parts of Santoquin and 7 parts by weight peanut oil, was then added to the yeast cake and the cake mixed for 5 minutes.

9 grams of TEM-4H were suspended in 114 ml. of water and heated to 180° F. while blending. This suspension was added to 2 kg. of cream yeast which contained 450 grams yeast solids and the yeast mixed for about one half an hour, filtered and pressed to yield a yeast cake containing about 35% solids. While being mixed, 285 grams of the yeast cake were sprayed with 30 ml. of water containing 0.2 gram 2-5-dihydroxybenzoic acid.

A TEM-4H suspension was prepared in the manner indicated immediately above and to it was added 4.2 ml. peanut oil containing 0.9 gram sesamol and 114 ml. of hot water. The suspension was blended and cooled and thoroughly mixed with 2 kg. of cream yeast containing 450 grams yeast solids. The cream yeast was then filtered and pressed to yield a yeast cake containing about 35 percent yeast solids.

16.4 grams of TEM-4H were suspended in 114 ml. of water and heated to 180° F. while blending. The suspension was cooled and added to 2 kg. of cream yeast which contained 826 grams of yeast solids. The yeast was thoroughly mixed and then filtered and pressed to yield a pressed yeast cake containing about 34.4 percent solids. 39 ml. of an ethanol solution containing 0.262 gram "Ethyl 702" was sprayed onto 380 grams of the pressed yeast cake while mixing.

360 grams of a suspension, containing one part soribitan monostearate and 9 parts of water, was prepared by slow heating to about 150° F. with mixing. 3.6 grams of "Ionox 100" suspended in 25.2 grams of peanut oil were added to this suspension and the mixture blended in a Waring Blendor for a few minutes. 23 grams of this mixture were thoroughly incorporated by mixing in 600 gm. of pressed yeast cake containing 35% solids.

21 gm. of a suspension, containing one part sorbitan monostearate and 9 parts of water, was prepared as above and incorporated into 600 gm. of a pressed yeast cake containing about 35 percent solids by thoroughly mixing for about 10 minutes. 1.87 gm. of a "Santoquin"-peanut oil solution containing about 70 percent "Santoquin" was sprayed onto the yeast cake, to achieve a 0.1 percent level of "Santoquin" based on the yeast solids, and the yeast mixed for 5 minutes.

Control products containing only a surfactant or emulsifier 40 gm. of sorbitan monostearate was mixed with 41 ml. of water to form a thick paste. This paste was added to 460 ml. of water at a temperature of 100° F. and mixed and heated until a temperature of 141° F. was reached to form a fine aqueous dispersion. The dispersion was cooled to about 120° F. and incorporated by mixing into cream yeast containing 2000 grams of yeast solids. The yeast was pressed in a filter press to about 35 percent solids and rediluted to about 31% solids.

9 gm. of TEM-4H were mixed with 114 ml. of water and heated to 180° F. with stirring and blended in a Waring Blendor for 5 minutes. This suspension was then cooled to 110° F. and incorporated into 2 kg. of cream yeast and mixed for about one-half hour. The cream yeast was filtered and pressed to about 35 percent solids.

All the yeast samples were then extruded into spaghetti form and dried in air maintained at a temperature in the range from 95° to 120° F. and at a relative humidity from about 10% to about 70% until the samples reached the moisture levels indicated in Table 1. These products were evaluated in the fresh state as well as after storage in air at elevated temperatures, for their ability to leaven a sweet dough. In the fresh state, portions of the products were rehydrated in water at a temperature of 100° F. and 70° F. The leavening activity of yeast after being rehydrated at 70° F. is the measure of the yeast's cool water tolerance. The stored products were rehydrated in water at 100° F. The results of the tests are given in Table 1. Leavening Activity is defined as follows:

Fermentation time

The time required for a given weight of sweet dough, maintained at 86° F., to rise to a predetermined volume.

Proof time

The time required for the dough to reach the predetermined volume after being punched down.

ing activity and effective to impart cool water tolerance to said yeast product.

6. An active dry yeast product as defined in claim 1, containing in addition a small amount of a surfactant or

| Sample | | Percent Moisture | Initial Leavening Activity | | | | Leavening Activity After Storage,[1] at 86° F. in Air for— | | | | | |
|---|---|---|---|---|---|---|---|---|---|---|---|---|
| | | | Rehydrated at 100° F. | | Rehydrated at 70° F. | | 1 month | | 2 months | | 3 months | |
| Antioxidant | Surfactant | | Fermentation Time, min. | Proof Time, min. | Fermentation Time, min. | Proof Time, min. | Fermentation Time, min. | Proof Time, min. | Fermentation Time, min. | Proof Time, min. | Fermentation Time, min. | Proof Time, min. |
| 0% | 0% | 8.1 | 88 | 69 | 106 | 86 | 107 | 88 | 139 | 119 | 193 | 160 |
| 0% | 0% | 4.8 | 126 | 100 | >300 | (2) | (3) | (3) | (3) | (3) | (3) | (3) |
| 0.1% Ionox 100 | 1% TEM-4H | 6.3 | 76 | 62 | 81 | 65 | 93 | 75 | 109 | 90 | 111 | 95 |
| 0.1% Santoquin | 1% TEM-4H | 6.2 | 87 | 68 | 90 | 72 | 93 | 78 | 111 | 93 | 133 | 113 |
| | | | | | | | 1 Month at 100° F. | | | | | |
| 0% | 0% | 8.0 | 92 | 68 | (3) | (3) | 159 | 129 | | | | |
| 0% | 0% | 6.6 | 113 | 81 | (3) | (3) | 152 | 126 | | | | |
| 0% | 2% TEM-4H | 4.7 | 80 | 64 | 112 | 81 | 249 | (2) | | | | |
| 0% | 2% sorbitan monostearate | 6.7 | 91 | 65 | (3) | (3) | 180 | 157 | | | | |
| 0% | 2% sorbitan monostearate | 4.6 | 96 | 71 | (3) | (3) | 198 | (2) | | | | |
| 0.2% Sesamol | 2% TEM-4H | 4.1 | 75 | 60 | 80 | 67 | 109 | 103 | | | | |
| 0.2% Ethyl 702 | 2% TEM-4H | 4.4 | 75 | 62 | 105 | 85 | 120 | 109 | | | | |
| 0.2% 2,5-dihydroxybenzoic acid | 2% TEM-4H | 4.7 | 80 | 63 | 112 | 86 | 116 | 95 | | | | |
| 0.2% Santoquin | 2% sorbitan monostearate | 6.5 | 90 | 63 | (3) | (3) | 116 | 93 | | | | |
| 0.2% Santoquin | 2% sorbitan monostearate | 4.3 | 95 | 67 | (3) | (3) | 115 | 91 | | | | |

[1] The dried yeast was rehydrated in water at 100° F.  [2] Very slow.  [3] Not determined.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What we claim is:

1. An active dry yeast product comprising yeast having a low moisture level and a small but effective amount of an antioxidant selected from the group consisting of 4-hydroxymethyl-2,6-di-tert-butylphenol; 4,4-methylenebis (2,6-di-tert-butylphenol); 3,4-methylene dioxyphenol; 2,5-dihydroxybenzoic acid and 1,2-dihydro-6-ethoxy-2,2,4-trimethyl quinoline, which compounds impart to said product superior air storage stability.

2. An active dry yeast product as defined in claim 1 having a moisture content below about 6 percent by weight.

3. An active dry yeast product as defined in claim 2, wherein the amount of antioxidant is between about 0.025 and 0.5 percent by weight.

4. An active dry yeast product as defined in claim 3, wherein the amount of antioxidant is between about 0.1 and about 0.2 percent by weight.

5. An active dry yeast product as defined in claim 1, containing in addition a small amount of a surfactant or emulsifier effective to permit drying of said yeast to low moisture levels without substantially reducing its leavening activity or effective to impart cool water tolerance to said yeast product.

emulsifier effective to permit drying of said yeast to low moisture levels without substantially reducing its leavening activity or effective to impart cool water tolerance to said yeast product.

7. An active dry yeast product as defined in claim 5 having a moisture content up to about 7.5 percent by weight.

8. An active dry yeast product as defined in claim 7, wherein the surfactant or emulsifier amounts to between about 0.25 and about 5 percent by weight.

9. An active dry yeast product as defined in claim 8, wherein the surfactant or emulsifier amounts to between about 1 and about 2 percent by weight.

10. An active dry yeast product as defined in claim 5, wherein the moisture level of said product is between about 4 and about 7 percent by weight.

11. An active dry yeast product as defined in claim 8, wherein the moisture level of said product is between 4 and about 7 percent by weight.

References Cited

UNITED STATES PATENTS 2,919,194  12/1959  Johnston _____ 99—96
3,041,249   6/1962  Chen et al. _____ 195—74

LIONEL M. SHAPIRO, *Primary Examiner.*

D. M. NAFF, *Assistant Examiner.*

U.S. Cl. X.R.

195—74, 58